United States Patent
Chen

(10) Patent No.: US 11,282,293 B2
(45) Date of Patent: Mar. 22, 2022

(54) METHODS AND APPARATUS FOR BORDER-OWNERSHIP REPRESENTATION OF OCCLUDING CONTOURS FOR IMAGES

(71) Applicant: Tianlong Chen, Germantown, MD (US)

(72) Inventor: Tianlong Chen, Germantown, MD (US)

( * ) Notice: Subject to any disclaimer, the term of this patent is extended or adjusted under 35 U.S.C. 154(b) by 53 days.

(21) Appl. No.: 16/851,608

(22) Filed: Apr. 17, 2020

(65) Prior Publication Data
US 2021/0326633 A1 Oct. 21, 2021

(51) Int. Cl.
*G06V 10/44* (2022.01)
*G06N 3/08* (2006.01)
*G06K 9/62* (2022.01)

(52) U.S. Cl.
CPC ........... *G06V 10/44* (2022.01); *G06K 9/6256* (2013.01); *G06K 9/6262* (2013.01); *G06N 3/08* (2013.01)

(58) Field of Classification Search
CPC combination set(s) only.
See application file for complete search history.

(56) References Cited

U.S. PATENT DOCUMENTS

2015/0293228 A1* 10/2015 Retterath .............. G01S 17/931
356/5.01
2018/0336683 A1* 11/2018 Feng ...................... G06V 10/44
2019/0213439 A1* 7/2019 Liu ......................... G06V 10/56
2019/0311202 A1* 10/2019 Lee ....................... G06K 9/6256

OTHER PUBLICATIONS

Edward Craft, "A Neural Model of Figure-Ground Organization",Apr. 18, 2007, J Neurophysiol 97: 4310-4326, 2007, doi:10.1152/jn.00203.2007.pp. 4310-4315.*
Fangtu T Qiu, "Figure-ground mechanisms provide structure for selective attention—Fangtu T Qiu", Oct. 7, 2007, nature neuroscience, Nature Neuroscience vol. 10, No. 11 ,Nov. 2007, pp. 1492-1497.*
Akihiro Eguchi,"Neural network model develops border ownership representation through visually guided learning," Oct. 13, 2016, Neurobiology of Learning and Memory,Neurobiology of Learning and Memory 136 (2016),pp. 147-160.*
Li Zhaoping,"Border Ownership from Intracortical Interactions in Visual Area V2" ,Jul. 7, 2005,Neuron, vol. 47, DOI 10.1016/j.neuron.2005.04.005,pp. 143-150.*
RüdigervonderHeydt,Figure-ground organization and the emergence of proto-objects in the visual cortex, Nov. 3, 2015,Frontiers in Psychology,Nov. 2015,vol. 6,pp. 1-7.*
Albert Yankelovich,"Predicting Illusory Contours Without Extracting Special Image Features," Jan. 18, 2019, Frontiers in Computational Neuroscience, vol. 12,pp. 1-13.*

* cited by examiner

*Primary Examiner* — Omar S Ismail

(57) ABSTRACT

The invention discloses methods and apparatuses of coding border-ownership representation of occluding contours of objects in images; the invention further discloses methods and apparatuses for generating such border-ownership representation for a given image by training and using neural networks.

5 Claims, 5 Drawing Sheets

METHODS AND APPARATUS FOR BORDER-OWNERSHIP REPRESENTATION OF OCCLUDING CONTOURS FOR IMAGES

REFERENCES

1. Eddy Ilg, Nikolaus Mayer, Tonmoy Saikia, Margret Keuper, Alexey Dosovitskiy, Thomas Brox, "*FlowNet 2.0: Evolution of Optical Flow Estimation with Deep Networks*", arXiv: 1612.01925, 6 Dec. 2016
2. Fangtu T. Qiu and Rudiger von der Heydt, "*Figure and Ground in the Visual Cortex: V2 Combines Stereo scopic Cues with Gestalt Rules*", Neuron. 2005 Jul. 7; 47(1): 155-166
3. Hee-kyoung Ko and Rudiger von der Heydt, "*Figure-ground organization in the visual cortex: does meaning matter?*" Journal of Neurophysiology. 119(1): 160-176, 2018
4. Jonathan R. Williford and Rudiger von der Heydt, "*Border-ownership coding*", Scholarpedia J.; 8(10): 30040-. HIN Public Access Author Manuscript; available in PMC 2014 Jul. 27
5. Kaiming He, Xiangyu Zhang, Shaoqing Ren and Jian Sun, "*Deep Residual Learning for Image Recognition*", arXiv:1512.03385v1, 10 Dec. 2015
6. Olaf Ronneberger, Philipp Fischer, and Thomas Brox, "*U-Net: Convolutional Networks for Biomedical Image Segmentation*", arXiv:1505.04597v1, 18 May 2015
7. Philipp Fischer, Alexey Dosovitskiy, Eddy Llg, Philip Hausser, Caner Hazibas, Vladimir Golkov, Patrick van der Smagt, Daniel Cremers, Thomas Brox, "*FlowNet: Learning Optical Flow with Convolutional Networks*", arXiv: 1504.06852v2, 4 May 2015
8. Rudiger von der Heydt, "*Figure-ground organization and the emergence of proto-objects in the visual cortex*", REVIEW, Frontiers in Psychology, published: 3 Nov. 2015, doi: 10.3389/fpsyg.2015.01695

FIELD OF THE INVENTION

The present invention is related to a border-ownership representation of object occlusion contours on an image, and is related to systems and methods of using deep neural networks, given an image, to generate such a border-ownership representation; the image could be single static image, or one image from image sequence or video.

BACKGROUND OF THE INVENTION

Segmenting object boundaries in images is one of fundamental tasks in computer vision; it is also referred to as 'figure-ground organization' or 'figure-ground representation' in neural science, that is a process by which the visual system identifies some image regions as foreground, a.k.a. 'figure' (or called 'object' in computer vision literatures) and other regions as background, a.k.a. 'ground'. A 'figure' in front occludes background or other 'figures'; or a part of 'figure' occludes another part of the same 'figure', which is also called self-occlusion. The boundaries or borders between two objects or between objects and background are referred to as occluding contours for front occluding objects. The occluding object is called the (border) owner of the occluding contours (or borders).

The subject matter disclosed herein related to, methods of coding the border-ownership of the contours (or called boundaries or called borders) between two objects or between object and background or between two occluding parts of the same object; and the subject matter disclosed herein related to a method and apparatus for automatically generating a border-ownership representation of object boundaries in a given image.

Referring to the above Referenced paper "*Figure-ground organization and the emergence of proto-objects in the visual cortex*" published in 2015 by Rudiger von der Heydt, "many neurons, especially in area V2, are selective for border ownership", and such "neuron has a fixed preference of location on one side or the other", meaning that such neuron has preferred owner side of border, indicating "that border ownership preference is a fixed property of the neuron". These are significant neural science findings on human or primate visual systems. The invention disclosed herein on border-ownership coding (or called border-ownership representation) is primarily based on these neural science findings. The "fixed property of the neuron" provides the default border-ownership representation of spatial relationship between objects at the first glance.

Referring to the same Referenced paper in 2015 by Rudiger von der Heydt, the "fixed property of the neuron" indicates that the border-ownership is not dependent on external conditions such as motion or disparity, though the border-ownership coding might be able to be extracted from motion or disparity cues. Such "fixed property of the neuron" explains why human eye can distinguish border-ownership of objects in most cases of both single static image and stereo or motion multi-images in a similar way; though in complicated cases such as illusory contours or camouflage, other cues such as motion or disparity cues and other mechanisms such as attention are involved to provide border-ownership that is different from the default one at first glance, as was indicated by the fact of "reversal of border ownership signals with the change of perceived object structure". The methods and apparatus disclosed herein on automatically generating border-ownership coding of objects requires only one input image; and the generated border-ownership representation is the default one "at first glance".

T-junction (or called Y-junction if not perfectly forming a 'T') at occluding borders are often suggested in many literatures to be used to predict occluding order (a.k.a. border-owner sides) between two objects or between object and background; in the disclosed invention herein the author argues that the T-junction is merely a visual side product and is of little use in determining border-ownership, as it is highly possible that the two overlapping contours at the T junction are coded in different channels in the disclosed invention herein.

SUMMARY OF THE INVENTION

The invention discloses methods and apparatuses of coding border-ownership representation of occluding contours of objects in images; the invention further discloses methods and apparatuses for generating such border-ownership representation for a given image by training and using neural networks.

BRIEF DESCRIPTION OF THE DRAWINGS

Exemplary embodiments of the present disclosure are shown in the drawings and will be explained in detail in the description that follows.

DESCRIPTION OF THE PREFERRED EMBODIMENT

Figure 1:
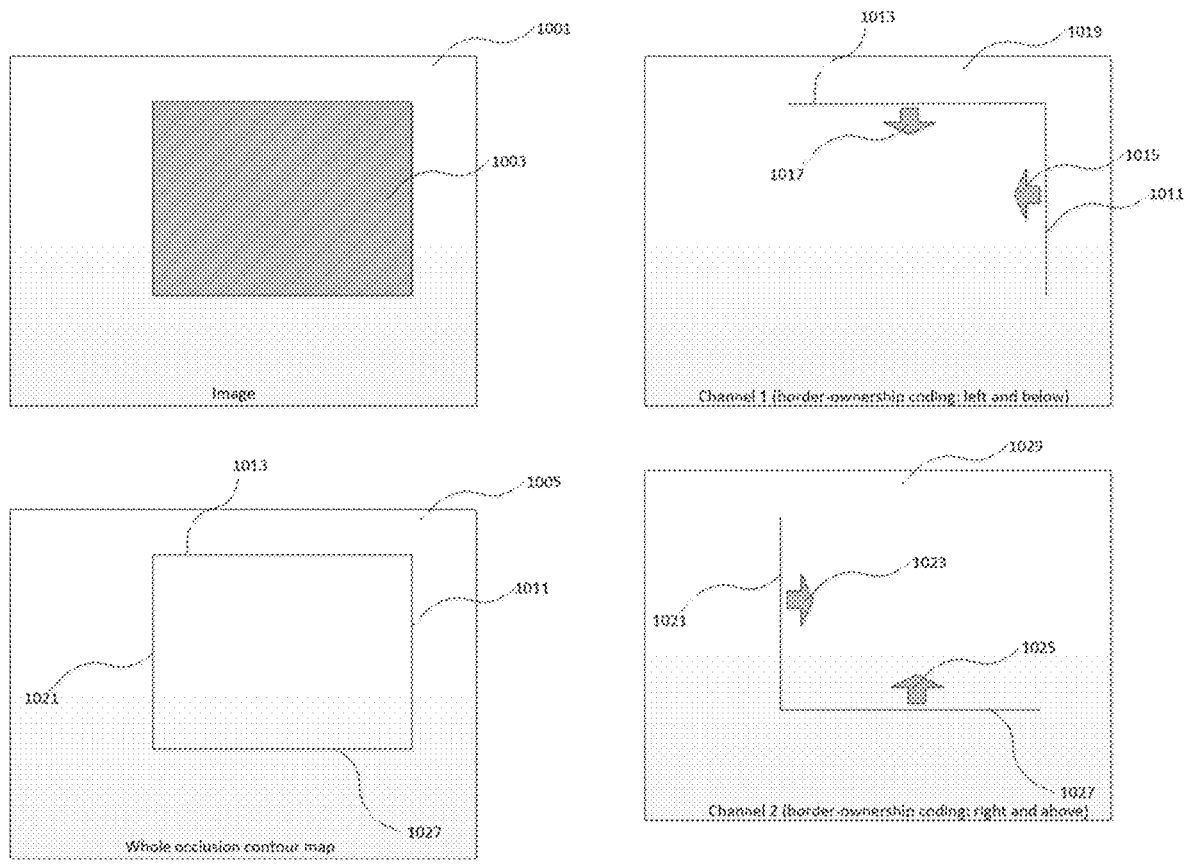
FIG. 1 is a schematic diagram showing a 2-channel contour border-ownership coding method applied to an example image of an object: a rectangle.

Exemplary embodiments of the invention are shown in the drawings and will be explained in detail in the description that follows.

A colored image normally can be represented by three color components of Red, Green and Blue, i.e. RGB, a three-channel map in which each channel represents one of the three components; whereas normally contours in an image can be represented by a one-channel map in which contour pixel of objects is 1 (or non-zero values) and rest area are 0. The invention disclosed herein extends such channel map convention in representing border-ownership coding by a 2-channel map (FIGS. 1 and 2) or a 4-channel map (FIG. 3) as preferred embodiment of the present invention; and further a 8-channel or 16-channel maps could similarly be used in coding border-ownership.

Referring to FIG. 1, 1001 is an example simple image with a shadowed rectangle 1003 as an example object; the 1005 shows a contour map of the example image 1001, including four contour (border) segments 1011, 1013, 1021, and 1027, they are parts of occluding contours of the example rectangle object 1003; and the 'rectangle' object 'inside' is the owner (or called owner side, the 'owner' or 'owner side' are used exchangeable herein in the disclosed invention) of these four border segments in the example. For an image with more complicated occluding contours, occluding contours can be separated into multiple relatively straight contour/border segments like 1005; the border segments referred herein are such relatively straight segments for processing simplicity as exemplary embodiment of the disclosed invention. Still referring to FIG. 1, the 1019 and 1029 show a two-channel border-ownership coding maps. Channel 1 map 1019 shows all border segments (1013 and 1011) of all objects (here only one rectangle object 1003 in this simple example) whose border-owners are 'below' 1017 of 1013 or 'left' 1015 of 1011; the 1013 border segment is the top contour segment (of the example rectangle) whose border-owner side is the rectangle located 1017 'below' 1013; the 1011 contour segment is the right contour segment (of the example rectangle) whose border-owner side is the rectangle located 1015 'left' of 1011. Channel 2 map 1029 shows all border segments (1021 and 1027) of all objects (here only one rectangle 1003 in this simple example) whose border-owners are 'above' 1025 of 1027 or 'right' 1023 of 1021; the 1027 border segment side is the bottom contour segment (of the example rectangle) whose border-owner is the rectangle located 1025 'above' of 1027; the 1021 border segment is left contour segment (of the example rectangle) whose border-owner side is located 1023 'right' of 1021.

The general rule of coding border-ownership (or more precisely, coding border-owner sides) disclosed herein is to use different channels to code border segments with opposite border-owner sides, the rule is herein referred to as "opposite channel rule" for description simplicity; i.e. the (horizontal) border segments with 'above' owner sides are in one channel, the (horizontal) border segments with 'below' owner sides will be in another channel; the (vertical) border segments with 'left' owner sides are in one channel, the (vertical) border segments with 'right' owner sides will be in another channel. This rule is used for both 2-channel border-owner coding scheme, and 4-channel border-owner coding scheme; and similarly it can be used for 8-channel and 16-channel border-owner coding schemes as the description that follows.

Figure 2:
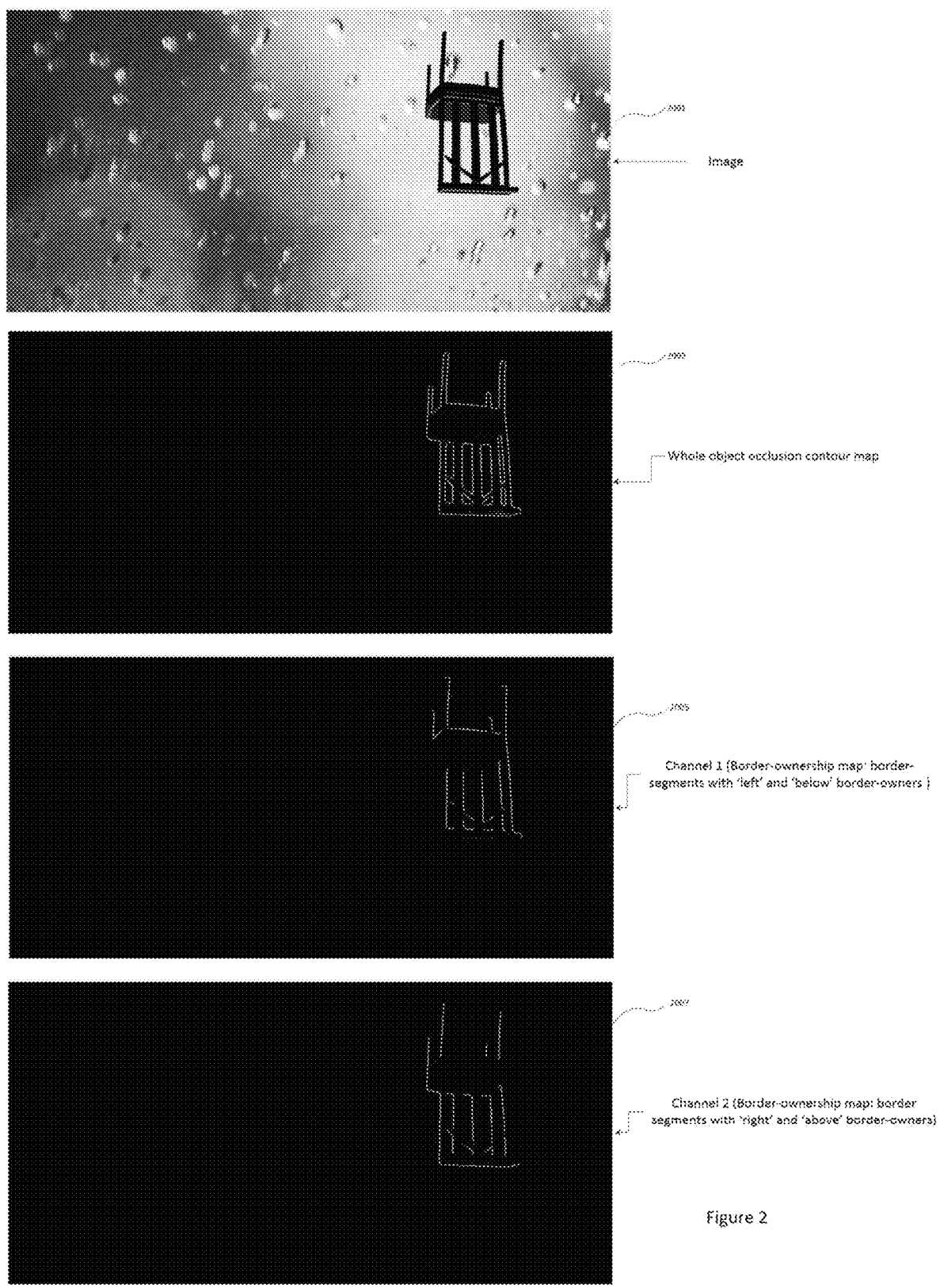
FIG. 2 is actual pictures showing 2-channel contour border-ownership coding method applied to real-world image of a chair.

FIG. 2 shows a real example image 2001 of an object chair. And 2003 contour map shows the whole (the most external) occluding contours of the chair (though the contour map does not show self-occlusion contours); 2005 and 2007 are, respectively, the $1^{st}$ and $2^{nd}$ channels of a 2-channel border-ownership coding scheme which uses the same coding rule above and illustrated in FIG. 1; $1^{st}$ channel includes all contour segments (or border segments) whose owner sides are either 'below' or 'left' sides; $2^{nd}$ channel includes all contour segments (or border segments) whose owner sides are either 'above' or 'right' sides.

Referring to FIG. 2, not all contour/border segments are straight horizontal or vertical. According to the "opposite channel rule", a slope border segment can be put (coded) into either channel 1 or channel 2 of a 2-channel border-ownership coding scheme, depending on the owner side of a border segment and how the slope of the border segment is closer to one of four cases (called "horizontal-vertical cases" for description simplicity herein): (1) a (bottom) horizontal border segment with 'above' border-owner side, (2) a (top) horizontal border segment with 'below' border-owner side, (3) a (left) vertical border segment with 'right' border-owner side, and (4) a (right) vertical border segment with 'left' border-owner side; for the exemplary embodiment of 2-channel border-ownership coding scheme, the border segments in (2) and (4) cases are put into Channel 1, and the border segments in (1) and (3) cases are put into Channel 2 as illustrated in FIGS. 1 and 2. For an example of slope border segment, if the slope angle of a border segment (slope angle is reference to a directional horizontal line pointing to right herein as exemplary embodiment, same in this disclosed invention if not specified otherwise) is less than 45° and the owner side of the border segment is 'below', then this border segment is considered closer to case (2), the slope border segment will be put into Channel 1 of the 2-channel border-ownership coding scheme; if the slope angle of a border segment is less than 45° and the owner side of the border segment is 'above', this border segment is considered closer to case (1), which will be put into Channel 2 of the 2-channel border-ownership coding scheme; if the slope angle of a border segment is greater than or equal to 45° and less than 90° and the owner of the border segment is (more) 'left' and 'above', the border segment is considered closer to case (4), which will be put into Channel 1; other slope angle cases can be coded similarly.

Figure 3:
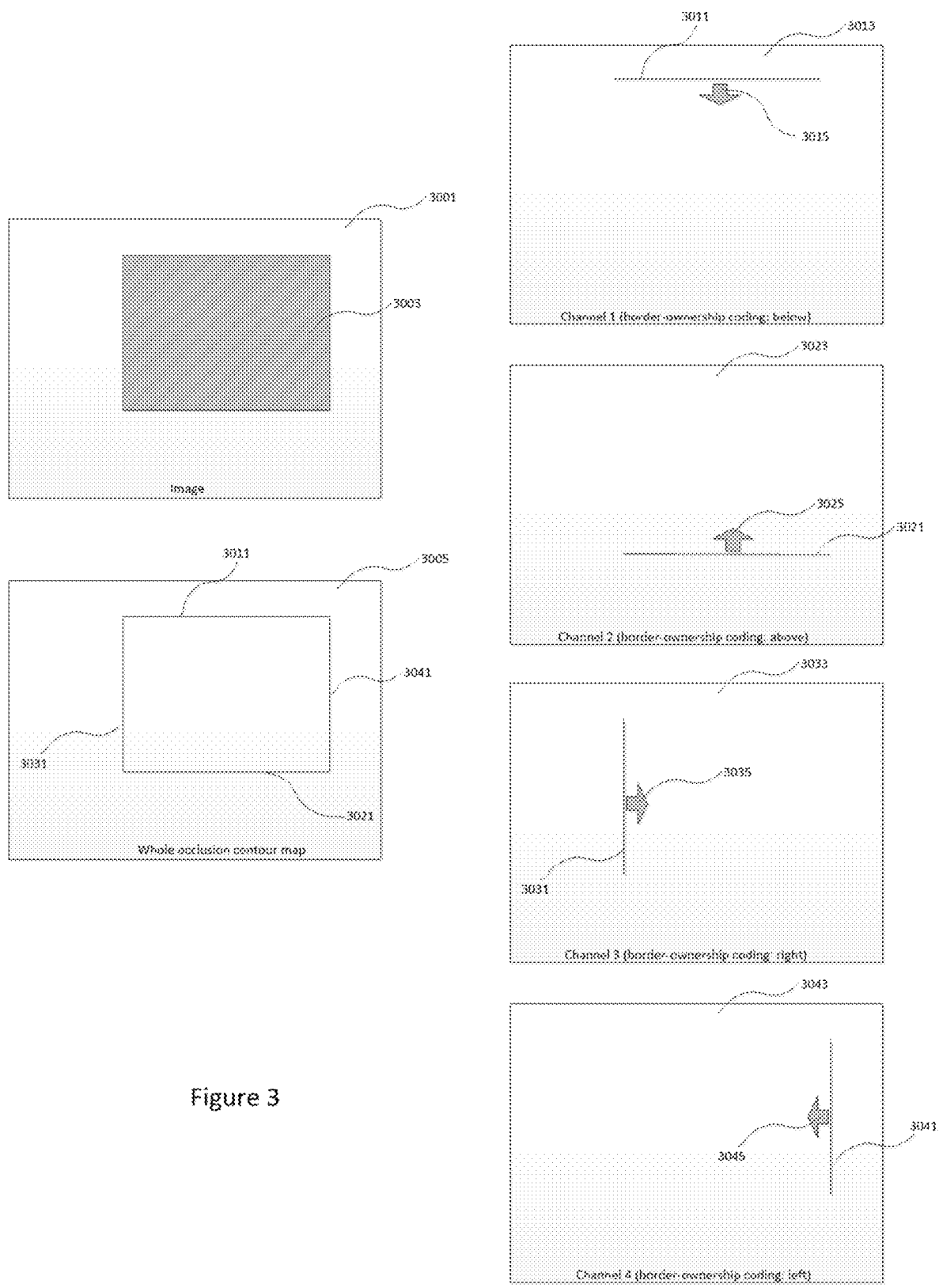
FIG. 3 is a schematic diagram showing a 4-channel contour border-ownership coding method applied to an example image of a rectangle object.

For an exemplary embodiment of 4-channel border-ownership coding scheme, the border segments in these four "horizontal-vertical cases" above are coded into four different channels, as illustrated in FIG. 3. Using the slope angle of border segment, the four "horizontal-vertical cases" can be categorized into four slope angle cases of 2×(0°, 90°), i.e. 2 multiples of 90°, whereas "2×" is for two owner sides of each slope angle, a.k.a. 'above' vs 'below', or 'left' vs 'right', each of 4 cases is coded in one of 4 channels in a 4-channel border-ownership coding scheme. Similarly, extending the slope angle cases into 8 cases of 2×(0°, 45°, 90°, 135°), i.e. 4 multiples of 45° and "2×" for two owner sides of each slope angle, each of 8 cases is coded in one of 8 channels of a 8-channel border-ownership coding scheme; further extending the slope angle cases to 16 cases of 2×(0°, 22.5°, 45°, 67.5°, 90°, 112.5°, 135°, 157.5°), i.e. 8 multiples of 22.5° and "2×" for two owner sides of each slope angle, each of 16 cases is coded in one of 16 channels in a 16-channel border-ownership coding scheme. Obviously, other slope angle configuration (i.e. other than multiples of 90°, 45°, or 22.5°) can also be similarly used.

As the "fixed property of the neuron" provides the default border-ownership representation of figure-ground at the first glance, using the above disclosed border-ownership coding scheme, we can train a convolutional neural network as exemplary embodiment to learn such "fixed property".

Referring to the above Referenced paper of "*U-Net: Convolutional Networks for Biomedical Image Segmentation*" by Olaf Ronneberger and et al., the Referenced paper of "*FlowNet: Learning Optical Flow with Convolutional Networks*" by Philipp Fischer and et al., and the Referenced paper of "*FlowNet 2.0: Evolution of Optical Flow Estimation with Deep Networks*" by Eddy Ilg and et al., by combining U-Net and FlowNet/FlowNet2, a simple convolutional network as illustrated in FIG. 1 as an exemplary embodiment of a convolutional neural network (referred as "TcNet" herein for description simplicity) can be trained to learn the "fixed property" of border-ownership relations between objects from ground truth pairs of images and border-ownership coding maps, following the similar training procedures as U-Net or FlowNet.

Figure 4:
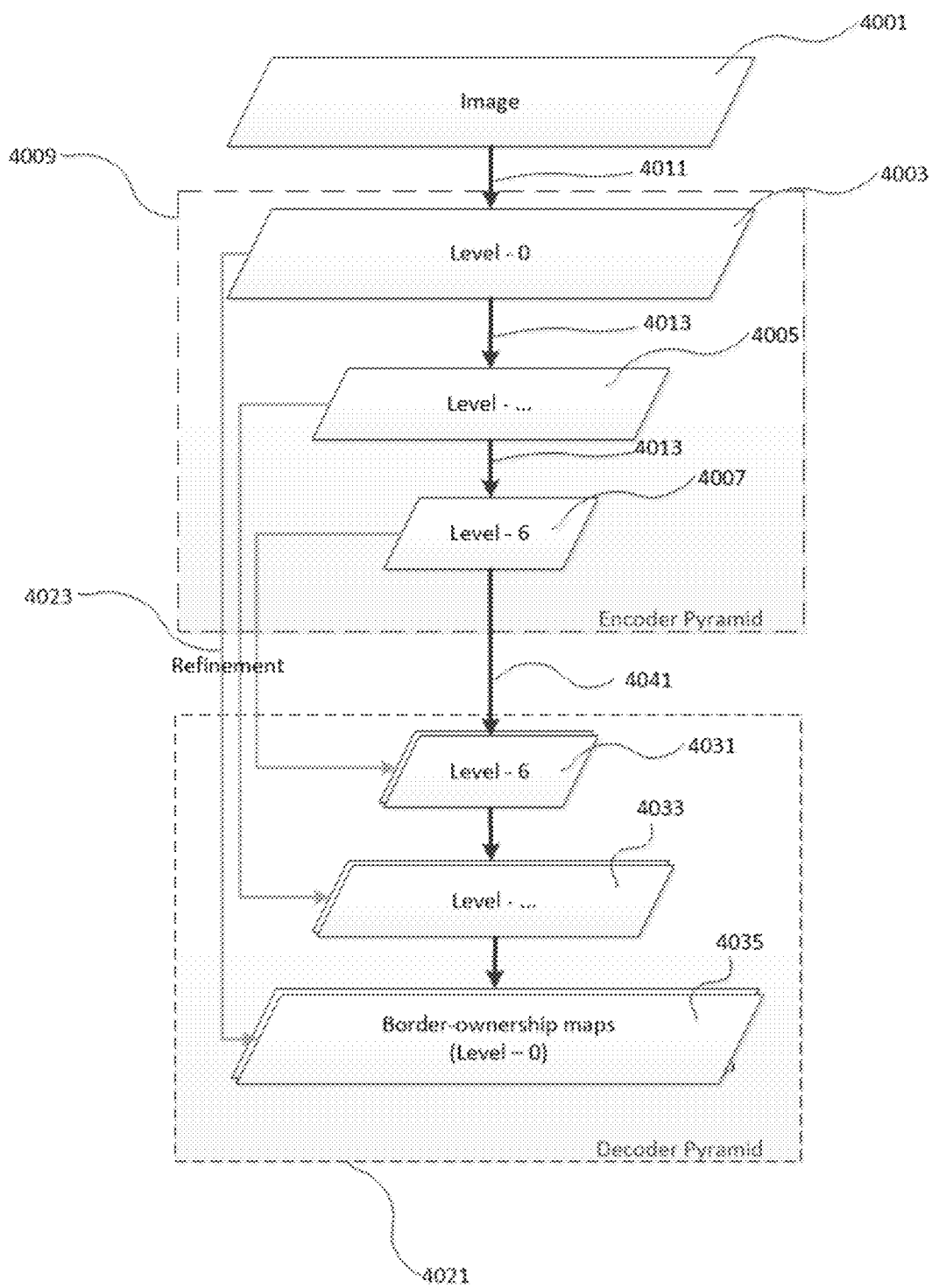
FIG. 4 is a schematic diagram of an encoder-decoder convolutional neural network to generate a contour border-ownership representation map (or called contour border-ownership coding map) for a given input image.

Referring to FIG. 4 as exemplary embodiment of training a convolutional neural network TcNet to learn "fixed property" of border-ownership coding, the TcNet is an encoder-decoder convolutional neural network; the input to the TcNet for training is batch of single (3-channel RGB) images 4001 with resolution of M×N×C, where M is height of image, N is width of image, and C=3 for 3-channel RGB image (or C=1 for gray image); the encoder portion (or called Encoder pyramid 4009) has layer-0 4003, layer-1, ... 4005, down to layer-6 4007; each layer-n has a resolution of $M_n \times N_n \times C_n$ where $M_n = M/2^n$, $N_n = N/2^n$, and $C_n$ is number of channels in output of layer-n, n=0, ..., 6; the output of layer-n is 4013 the input of layer-n+1 except that images 4001 are 4011 the input of layer-0 4003; each layer (in Encoder pyramid 4009) is a ResNet block as exemplary embodiment in the disclosed invention, where the ResNet block can be referenced from the Referenced paper of "*Deep Residual Learning for Image Recognition*" by Kaiming He and et al.

Still referring to FIG. 4, the decoder portion (or called Decoder pyramid 4021) has layer-6 4031, layer-5, ... 4033, up to layer-0 4035; the output of each decoder layer-n (n=0, ..., 6) has the same resolution as that of encoder layer-n, i.e. $M_n \times N_n$ with different number of output channels; the decoder layers in TcNet are adapted from the layers in the decoder portion of FlowNet (excluding its correlation portion); the output of decoder layer-0 has the same resolution as that of encoder layer-0 and the input image, i.e. M×N; each encoder layer-n (n=0, ... 6) has a refinement connection to the corresponding decoder layer-n similar to in U-Net, meaning the output of encoder layer-n becomes part of input to decoder layer-n; for k-channel border-ownership coding scheme, each decoder layer-n will also output, in training TcNet, a k-channel map to fit against (scaled to the same resolution at the layer-n) ground truth k-channel border-ownership coding map of the input image, where k is one of 2, 4, 8 or 16 as disclosed in the invention above. To avoid complicating the network training without losing the general applicability, M and N were chosen as multiples of $2^6 = 64$, such as M=512, N=1024 pixels in our experiments. TcNet uses the similar loss function at decoder layers and total loss as FlowNet. After network training, given an input image 4001, the decoder layer-0 4035 of the TcNet as exemplary embodiment, in TcNet inference, will output a k-channel border-ownership coding map (may need take with certain threshold to get thin border maps) for a given image where k is one of 2, 4, 8, and 16 for k-channel border-ownership coding scheme.

Figure 5:
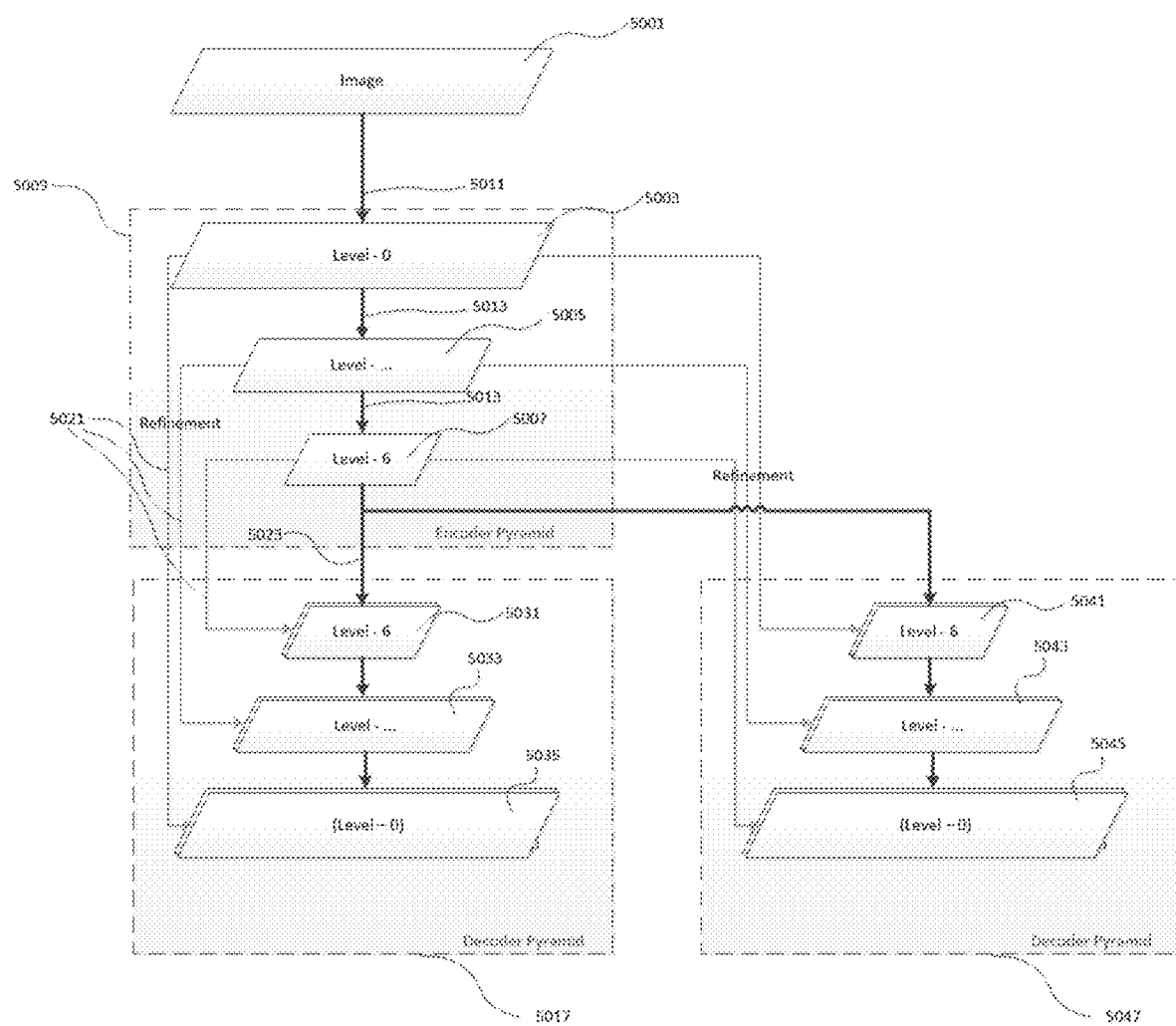
FIG. 5 is another schematic diagram of an encoder-decoder convolutional neural network to generate a 1-channel whole occluding contour map, and a contour border-ownership coding map for a given input image.

FIG. 5 illustrates a slightly different version of TcNet modified from the version in FIG. 4 by adding a separate branch of Decoder pyramid 5047, using $2^{nd}$ branch decoder pyramid 5047 for border-ownership coding map same as the decoder pyramid 4021 in FIG. 4, and using the additional $1^{st}$ branch decoder pyramid 5017 for a 1-channel whole occluding contour map which can be considered to be the summary of all k channels of k-channel border-ownership maps; it was found in our experiments that a separate branch for whole occluding contour map could make the training of TcNet to converge slightly faster and better with lower end-point-error (EPE). The $1^{st}$ branch decoder pyramid 5017 is similar to the $2^{nd}$ branch decoder pyramid 5047 except each layer in the $1^{st}$ branch decoder pyramid 5017 has an output to fit against 1-channel ground truth whole occluding contour map whereas each layer in $2^{nd}$ branch decoder pyramid 5047 has an output to fit against k-channel border-ownership coding map for k-channel border-ownership coding scheme (k is one of 2, 4, 8 or 16); i.e the ground truth including images, whole occluding contour maps and border-ownership coding maps associated with corresponding images. After network training, given an input image 5001, the $1^{st}$ branch decoder layer-0 5035 of TcNet in FIG. 5, in TcNet inference, will output 1-channel whole occluding contour map for the given image, and the $2^{nd}$ branch decoder layer-0 5045 of TcNet in FIG. 5 will output k-channel border-ownership coding map for the given image 5001 where k is one of 2, 4, 8 or 16.

Although the present invention has been described with reference to preferred embodiments, the disclosed invention is not limited to the details thereof, various modifications and substitutions will occur to those of ordinary skill in the art, and all such modifications and substitutions are intended to fall within the spirit and scope of the invention as defined in the appended claims.

What is claimed is:

1. A method for coding border-ownership representation of occluding contours of objects from an image, where said occluding contours of objects are comprised of a plurality of relatively straight border segments, at least comprising:
   using a plurality of at least two channels as said border-ownership representation, where said border segments with opposite border owner sides are put into different said at least two channels.

2. A method according to claim 1 for coding border-ownership representation of occluding contours of objects from an image, where said occluding contours of objects are comprised of a plurality of relatively straight border segments wherein said coding border-ownership representation using two channels further substantially comprising:
   (a) horizontal said border segment(s) or slope-close-to-horizontal said border segment(s) with 'below' border-owner sides are put in a first said channel, and horizontal said border segment(s) or slope-close-to-horizontal said border segment(s) with 'above' border-owner sides are put in a second said channel; and (b) vertical said border segment(s) or slope-close-to-vertical said border segment(s) with 'left' border-owner sides are put in a first said channel, and vertical said border segment(s) or slope-close-to-vertical said border segment(s) with 'right' border-owner sides are put in a second said channel.

3. A method according to claim 1 for coding border-ownership representation of occluding contours of objects from an image, where said occluding contours of objects are comprised of a plurality of relatively straight border segments wherein said coding border-ownership representation using four channels wherein said coding border-ownership representation further substantially comprising:

(a) horizontal said border segment(s) or slope-close-to-horizontal said border segment(s) with 'below' border-owner sides are put in a first said channel, and horizontal said border segment(s) or slope-close-to-horizontal said border segment(s) with 'above' border-owner sides are put in a second said channel, and vertical said border segment(s) or slope-close-to-vertical said border segment(s) with 'left' border-owner sides are put in a third said channel, and vertical said border segment(s) or slope-close-to-vertical said border segment(s) with 'right' border-owner sides are put in a fourth said channel.

4. A method according to claim 1 for coding border-ownership representation of occluding contours of objects from an image, where said occluding contours of objects are comprised of a plurality of relatively straight border segments wherein said coding border-ownership representation wherein said coding border-ownership representation further substantially comprising:

(a) said border segments with opposite border owner sides are put into different said channels based on the slope of said border segments.

5. A method for generating border-ownership representation of occluding contours of objects from a given source image using a neural network, wherein said occluding contours of objects are comprised of a plurality of relatively straight border segments and said border-ownership representation comprising said border segments with opposite border owner sides being put into at least different two channels, substantially comprising:

(a) training said neural network with a plurality of ground truth groups, where each said ground truth group is comprised of at least a ground truth image and a ground truth of said border-ownership representation associated with said ground truth image; and (b) after said training, input a said source image to trained said neural network, a said border-ownership representation can be produced as output from trained said neural network.

* * * * *